3,082,067
PROCESS FOR THE PRODUCTION OF ISOMETRIC FERROMAGNETIC GAMMA-FERRIC OXIDE
Franz Hund, Krefeld-Uerdingen, Germany, assignor to Farbenfabriken Bayer Aktiengesellschaft, Leverkusen, Germany, a corporation of Germany
No Drawing. Filed Apr. 28, 1959, Ser. No. 809,366
8 Claims. (Cl. 23—200)

The object of the present invention is to provide a technically satisfactory process for the production of ferromagnetic $\gamma$-$Fe_2O_3$ which consists in treating ferrous salt solutions, such as, for example, solutions of ferrous sulphate, ferrous nitrate, and preferably ferrous chloride, having an iron content of between 1 gram and 50 grams per liter with about 0.5 to 0.9 equivalent of a basic precipitating agent at temperatures between about 0 and 35° C., passing through the ferrous hydroxide suspension thus obtained about 1000 to 50,000 liters of air per hour per liter of the suspension, separating the $\gamma$-ferric hydroxide thus obtained from the aqueous phase and dehydrating it at temperatures between about 200 and 300° C.

In order to obtain larger quantities of $\gamma$-ferric hydroxides, the above process may be modified, if desired, by treating the weakly acid $\gamma$-ferric hydroxide suspension obtained according to the process described above, with more basic precipitating agent until a basic reaction is attained, oxidizing the ferrous hydroxide precipitating in this reaction by again passing air through it, adding further ferrous salt solution until the reaction of the mixture is weakly acid, and reoxidizing and again reprecipitating the ferrous hydroxide by passing air through it. The concentrated $\gamma$-ferric hydroxide suspension thus obtained is then worked up as described above.

A further increase of these precipitates may also be obtained in a simple manner by diluting the dispersions with water, then adding to them at temperatures between about 40 to 65° C., preferably between 50 and 55° C., metallic iron and also, if desired, a ferrous salt solution until the reaction is weakly acid, and then again passing air or another oxidizing agent through the mixture, for example, an aromatic nitro compound such as nitrobenzene. If desired, a ferrous salt solution and a solution or suspension of the precipitating agent may be added continuously with vigorous stirring and introduction of air so that a constant pH value is maintained within a range of between 4.5 and 7, preferably at 5.5. In this way, the desired ferric hydroxide or ferric oxide precipitates may be increased at a comparatively high rate.

Suitable basic precipitating agents are, for example, alkali metal and alkaline earth metal hydroxides and carbonates, such as, for example, sodium and potassium hydroxide, sodium carbonate, potassium carbonate and calcium hydroxide or calcium carbonate suspensions. Ammonia and organic amines have also been found to be satisfactory.

When the oxidation is carried out with air, care has to be taken that the contact between the air current and the reaction mixture is as intimate as possible, for example, by introducing the air in the form of extremely fine bubbles.

The following examples are given for the purpose of illustrating the invention.

*Example 1*

2200 milliliters of a 1.59 percent ferrous chloride solution are treated at room temperature with 105 milliliters of a 19.0 percent solution of sodium hydroxide. The precipitate is then rapidly oxidized (pH 6.5) by introducing a strong air current (3–5 m.$^3$/hour) until it shows an orange-yellow shade. The dispersion then contains about 0.17 percent of $FeCl_2$ and about 0.97 percent of $\gamma$-FeO(OH). The $\gamma$-FeO(OH) may be increased in the following manner:

The dispersion is diluted with the same amount of water. Sufficient ferrous chloride is then added to obtain a 0.5 percent salt solution. 300 grams of iron shavings are added and the oxidation is carried out at 56–65° C. for some days with air. The separated, washed and dried precipitate consists likewise of $\gamma$-FeO(OH) according to X-ray analysis, and of short and fairly isometric prisms according to electron microscopy.

*Example 2*

2200 milliliters of a 1.59 percent ferrous chloride solution are treated at room temperature with 100 milliliters of a 19.0 percent sodium hydroxide solution. The precipitate is rapidly oxidized (pH 6.0–6.5) by a strong air current (3–5 m.$^3$/hour) until it shows an orange-yellow shade. Further, 50 milliliters of a 19.0 percent sodium hydroxide solution are then added and the reprecipitated hydroxide is again rapidly oxidized (pH 9.5–10) until it shows an orange-yellow shade. Further 35 milliliters of a 35.0 percent ferrous chloride solution are then added, and the precipitate is again rapidly oxidized (pH 6.5) until it shows an orange-yellow shade. The dispersion then contains about 0.04 percent of $FeCl_2$ and about 1.39 percent of $\gamma$-FeO(OH).

The yield of $\gamma$-FeO(OH) can be increased in the following manner:

The dispersion is treated with 2400 milliliters of water, 20 milliliters of a 35 percent ferrous chloride solution and 300 grams of iron shavings and treated at 55–60° C. during several days with air, while stirring. After separation and washing of the precipitate, an orange-colored ferric hydroxide is obtained which consists likewise of $\gamma$-FeO(OH) according to X-ray analysis and of highly isometric prisms according to electron microscopy.

The hydrates obtained according to the two examples are dehydrated by heating to 230–260° C. and in this way converted into the ferromagnetic $\gamma$-$Fe_2O_3$.

*Example 3*

Seedings obtained as described in Example 1 or 2 are treated with water and small quantities of ferrous salts and heated to 40–65° C., preferably to 50–55° C., while introducing air. Equivalent quantities of a ferrous salt solution and sodium hydroxide solution are then run into the mixture during 4 days from two dropping funnels with constant introduction of air, so that a constant pH value within a range of about 4.5–7 is maintained. Small quantities of iron may also be used for buffering the suspension if its pH is not to be continuously checked. In the course of the oxidation, the seeding particles grow to similar but larger particles. The process is interrupted when the previously specified magnetic properties of the $\gamma$-$Fe_2O_3$ obtained from $\gamma$-FeO(OH) have been attained.

A process that had previously been described for the production of $\gamma$-ferric hydroxide or ferric oxide comprises the following: A concentrated, preferably a 15–20 percent ferrous chloride solution, is rapidly heated while stirring at elevated temperatures, preferably between about 80 and 95° C., with a solution or dispersion of an equivalent amount of an alkali metal or alkaline earth metal hydroxide so that the iron ions are completely precipitated. The highly viscous ferrous hydroxide dispersion initially formed is vigorously stirred at the same temperature until it becomes thinly liquid. During this process, dehydration of the ferrous oxide occurs to a certain extent. The dispersion is then cooled to room temperature and advantageously diluted with the same or 4 times its quantity of water, but preferably with a 0.5–2 percent ferrous chloride solution. A strong air current is then passed through the mixture at a slightly elevated temperature, preferably between about 24 and 30° C., so that the iron is converted into the trivalent oxidation state. In order to increase the yield of ferric oxide hydrate, further iron shavings may be added to the reaction mixture in several portions at moderately elevated temperatures (for example, 57 to 65° C.) during the last step of the process. After 3–5 days, an orange-red dispersion of γ-ferric hydroxide is obtained. The dispersion is filtered off, washed and dried at about 120° C. The hydroxide is then dehydrated by heating to 230–260° C. whereby brown-red γ-ferric oxide is formed.

The above process has the following disadvantages: First, it is necessary to heat the reaction mixture to about 80–95° C. during the precipitation of the ferrous ions and then to cool it. Secondly, by the partial dehydration of the initially obtained ferrous hydroxide, inclusions of ferrous oxide are formed which are not converted into the trivalent compound in the subsequent oxidation so that they contaminate the end product. Finally, the process yields essentially anisometric, pronounced needle-shaped γ-ferric hydroxides or oxides. However, in a number of fields where γ-ferric hydroxide or -oxide is used, for instance, in the synthesis of ferrite, particles are preferred which are as isometric as possible.

These disadvantages are obviated in the process according to the present invention, which yields, moreover, strongly isometric γ-$Fe_2O_3$ crystals.

I claim:

1. In a process for the production of isometric crystals of ferromagnetic gamma-ferric oxide which comprises the oxidation by air of a suspension of precipitated ferrous hydroxide obtained by treatment of a solution of a ferrous salt with a base, and subsequently separating, washing, and drying the said oxidized product, the improvement which comprises precipitating the ferrous hydroxide from a solution containing a ferrous salt having a concentration equivalent to an iron content between about 1 and about 50 grams per liter by admixing the said ferrous salt solution with between about 0.5 and about 0.9 of the amount stoichiometrically equivalent to the iron content of the solution of a base of the group consisting of ammonium, alkali-metal, and alkaline-earth-metal hydroxides and carbonates at a temperature between about 0 and about 35° C., and thereafter passing air through the resulting ferrous hydroxide suspension at a rate between about 1000 and 50,000 liters per hour per liter of suspension until the ferrous hydroxide is converted to ferric hydroxide, and subsequently separating the precipitated gamma-ferric hydroxide and dehydrating it at a temperature between about 200 and about 300° C.

2. A process as defined in claim 1 which includes the additional steps of adding, to the suspension containing seed crystals of gamma-ferric hydroxide, before separation and dehydration of the precipitated crystals, which is weakly acid at this point, an additional amount of a basic precipitating agent of the group consisting of ammonium, alkali-metal, and alkaline-earth-metal hydroxides and carbonates sufficient to make the suspension alkaline, passing an additional quantity of air through the said alkaline suspension to produce an additional quantity of gamma-ferric hydroxide, adding an additional quantity of a solution of a ferrous salt thereto until the suspension is again weakly acid, repeating the precipitation with one of the said basic precipitating agents and the passage of air therethrough until all the ferrous hydroxide is converted to ferric hydroxide, and subsequently separating the precipitated gamma-ferric hydroxide, and dehydrating it at a temperature between about 200° and about 300° C.

3. A process as defined in claim 1 which includes the additional steps of adding to the suspension containing seed crystals of gamma-ferric hydroxide, before separation and dehydration of the precipitated crystals, which is weakly acid at this point, metallic iron and an additional amount of a solution of a ferrous salt thereto until the solution is weakly acid, and while maintaining the said suspension at a temperature between about 40° and about 65° C., passing air therethrough until all the ferrous hydroxide is converted to ferric hydroxide, and subsequently separating the precipitated gamma-ferric hydroxide and dehydrating it at a temperature between about 200° and about 300° C.

4. A process as defined in claim 1 which includes the additional steps of adding continuously to the suspension containing seed crystals of gamma-ferric hydroxide, to which a solution of ferrous salt has been added until the suspension is weakly acid, while the said suspension is stirred continuously and maintained at a temperature between about 40° and about 60° C., a stream of a solution of a ferrous salt, a stream of a solution of one of the said basic precipitating agents, and a stream of air at such rates that the acidity of the suspension is maintained at a pH between about 4.7 and about 7.0.

5. A process as defined in claim 1, in which the ferrous salt is ferrous chloride.

6. A process as defined in claim 2, in which the ferrous salt is ferrous chloride.

7. A process as defined in claim 3, in which the ferrous salt is ferrous chloride.

8. A process as defined in claim 4, in which the ferrous salt is ferrous chloride.

References Cited in the file of this patent

UNITED STATES PATENTS

| | | |
|---|---|---|
| 2,463,413 | Neel | Mar. 1, 1949 |
| 2,560,970 | Martin | July 17, 1951 |
| 2,560,971 | Martin | July 17, 1951 |
| 2,694,656 | Camras | Nov. 16, 1954 |
| 2,866,686 | Bennetch | Dec. 30, 1958 |

FOREIGN PATENTS

| | | |
|---|---|---|
| 688,769 | Great Britain | Mar. 11, 1953 |
| 708,460 | Great Britain | May 5, 1954 |
| 717,269 | Great Britain | Oct. 27, 1954 |
| 721,630 | Great Britain | Jan. 12, 1955 |
| 891,625 | Germany | Oct. 1, 1953 |